INVENTOR.
Harold C. McCleery

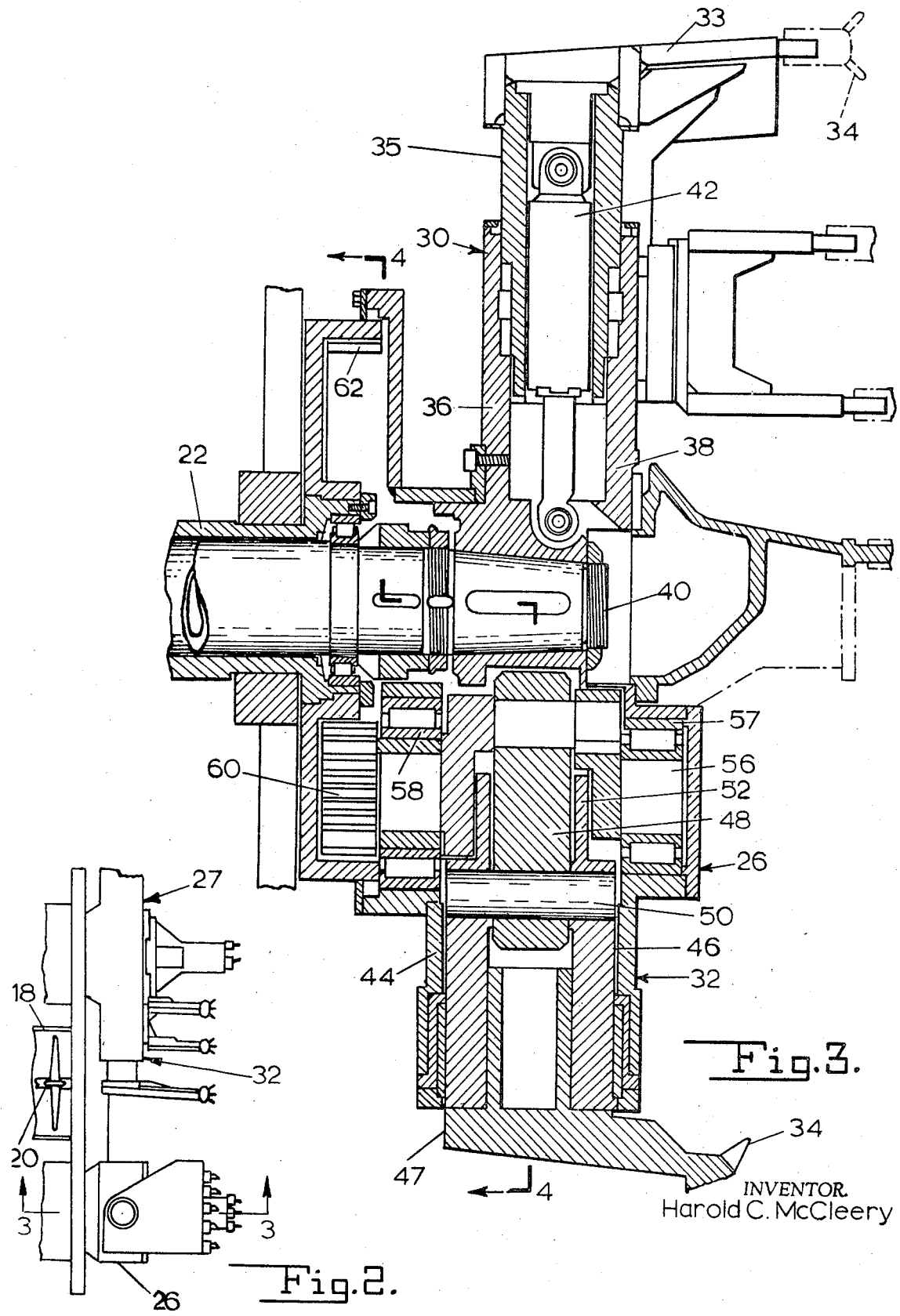

INVENTOR.
Harold C. McCleery

INVENTOR.
Harold C. McCleery.

3,523,711
CONTINUOUS MINER WITH CONTOUR
CUTTING BORING HEAD
Harold C. McCleery, R.D. 1, Franklin, Pa. 16323
Filed June 30, 1967, Ser. No. 650,281
Int. Cl. E21c 1/00
U.S. Cl. 299—59                                 4 Claims

ABSTRACT OF THE DISCLOSURE

A mining machine of the boring arm type for producing elongated overlapping substantially square or otherwise non-circular bores in a mineral vein with substantial elimination of the cusps normally remaining after the producing of overlapping circular bores by machines of the prior art.

---

This invention relates to mining machines and mining methods and more particularly to mining machines of the boring arm type having multiple boring heads thereon for the production of overlapping or contiguous non-circular bores in a mineral vein as a way of winning mineral in situ.

Such machines are well known in the art and have served the purpose of removing coal or otherwise winning mineral in situ. However, in boring type miners of the prior art, producing bores of circular cross-section, a pair of cusps remaining after the formation of the bores by the passage of boring heads had to be removed by separate cutting means such as a floor forming trim chain and a roof forming drum cutter or loop cutter to provide a substantially flat floor and roof for the operation of the mining machine within the opening formed by the cutting means.

The present invention obviates the necessity for auxiliary cutting means such as trim chains, drum cutters or loop cutters by providing for the formation of a substantially square or other non-circular bore having a flat floor portion and suitable roof contour or a plurality of such bores contiguous or overlapping in a manner that substantially eliminates the formation of cusps. The resulting elimination of separate roof and floor forming means and the drives therefor substantially reduces the cost and complexity of the boring type mining machine and increases the efficiency and reliability thereof.

These and other advantages resident in the mining machine of this invention will become more readily apparent upon consideration of the following description of preferred embodiments of this invention and of the drawings incorporated herewith in which:

FIG. 2 is a top plan view of the mining machine portion shown in FIG. 1;

FIG. 3 is a fragmentary sectional view on an enlarged scale of a portion of FIG. 2;

Figure 1:
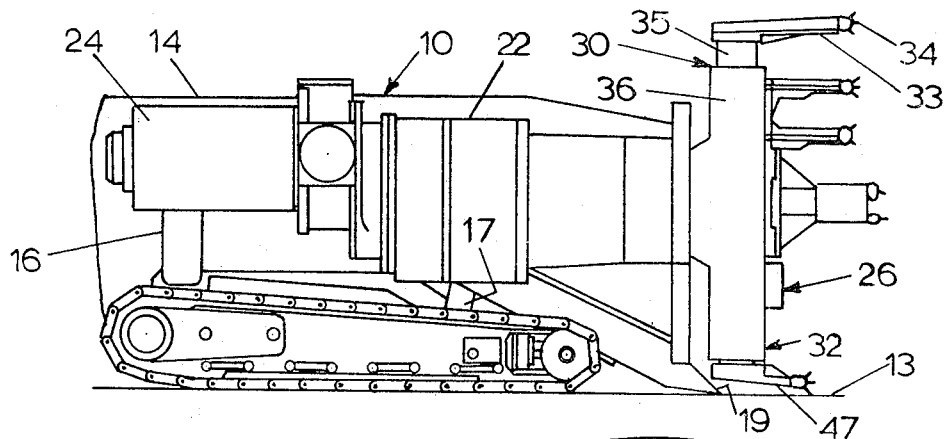
FIG. 1 is a side elevational view of a major portion of a mining machine constructed according to the principles of this invention.

Referring now to the drawings.

FIG. 1 shows a forward portion of a boring type mining machine generally indicated at 10 and comprising a mobile base 12 resting upon and supported by a substantially horizontal floor surface 13 and in turn adjustably supporting a main frame 14 through the use of extensible members such as hydraulic cylinders 16 and 17 in a manner well known in the art.

As best seen in FIG. 2 the main frame has an elongated conveyor trough 18 extending longitudinally, centrally therethrough with a conventional flight conveyor chain 20 adapted to move longitudinally therein to convey coal or other freshly mined mineral from the forward end of the boring machine 10 to the rearward end thereof (not shown) for delivery to a shuttle car or other conveying means as is well known.

Figure 6:
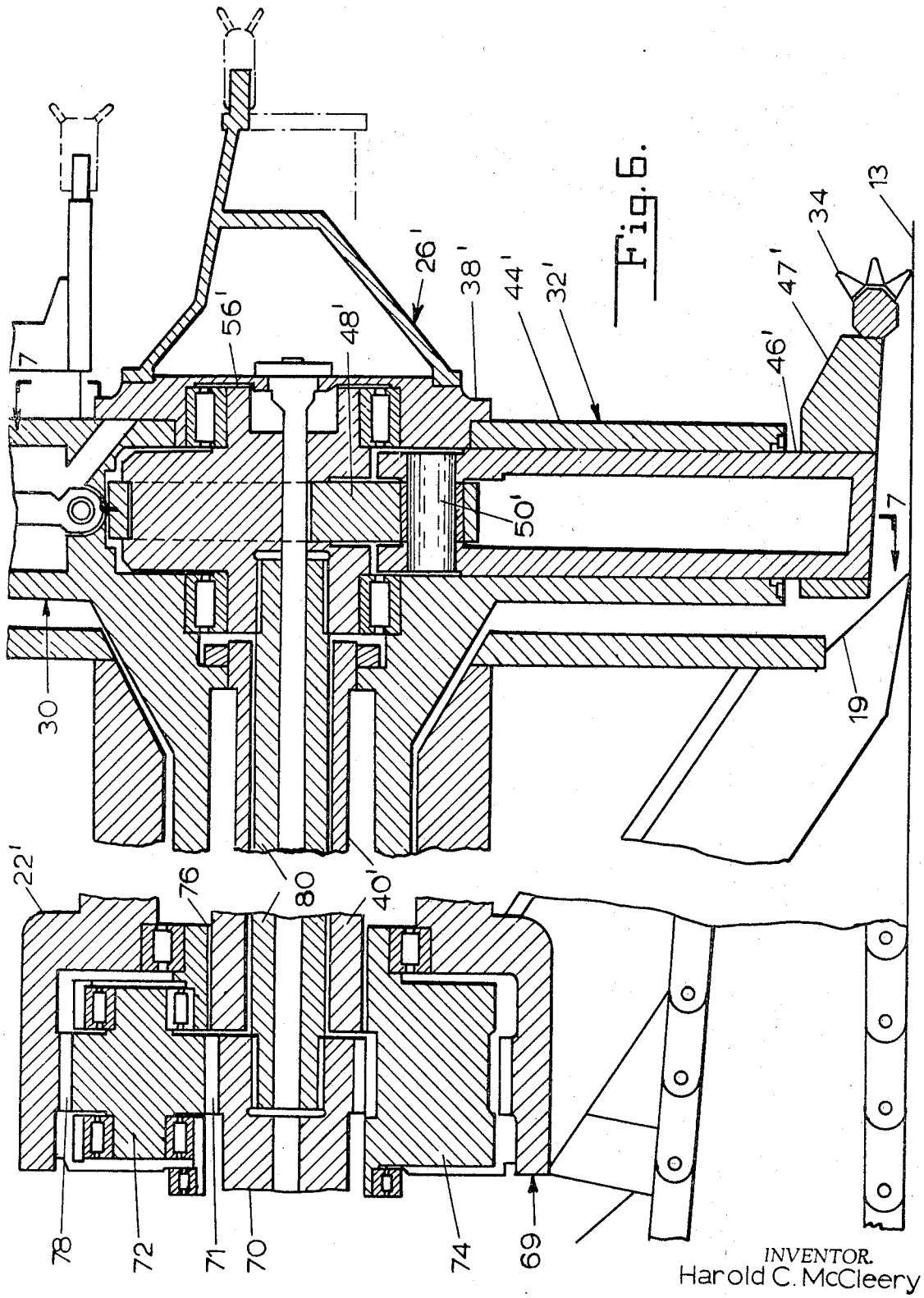
FIG. 6 is a fragmentary sectional view of a boring head illustrating a second embodiment of the principles of this invention.

On opposite sides of the forward portion of the main frame 14 are rigidly mounted two boring arm transmissions 22 powered by suitable electric motors 24 and suitably supplied with reduction gearing for the suitable slow speed rotation of right hand and left hand boring heads 26 and 27, respectively, in a manner well known in the art. Each of the boring heads 26 and 27 comprises a pair of boring arms 30 and 32 (upper and lower respectively as seen in FIGS. 2 and 6) each of which boring arms is suitably provided with bit carriers and bits 34 in a well known manner.

The upper boring arm 30 as seen in FIGS. 1–3 and 6–9 is of a well known retractable type similar to that shown and described in U.S. Pat. No. 3,110,482 (Ball) and comprises an elongated boring arm slide 35 of rectangular cross-section slidably and non-rotatably received within a radially disposed elongated hollow main arm portion 36 rigidly mounted on and rotatable with a hub portion 38 which is in turn mounted on and rotatable by a hollow boring arm shaft 40 extending forwardly from and rotatable by one of the transmissions 22. Rigidly mounted on the outer end of the conventional boring arm 30 is the usual bit carrier 33 supplied with bits 34 to cut a circular kerf in a mineral vein as the conventional arm 30 is rotated about the center line of the shaft 40 in a well known manner. The conventional arm 30 is made retractable by the slidable relationship of the slide 35 to the main arm portion 36 with the slide 35 being held in a desired position by an extensible member such as a hydraulic cylinder 42 connected between suitable portions of the slide 35 and the main arm portion 36 as more completely described and shown in the above cited Ball patent. Pressurized fluid for the operation of cylinder 42 is provided by suitable double tubing (not shown) within the hollow boring arm shaft 40 communicating at one end with the head end and rod end of the cylinder 42 and at the other end with a hydraulic circuit suitably valved to selectively supply pressurized fluid to the head end or rod end of the cylinder 42 as desired while connecting the opposite end of the cylinder 42 to tank.

Figure 4:
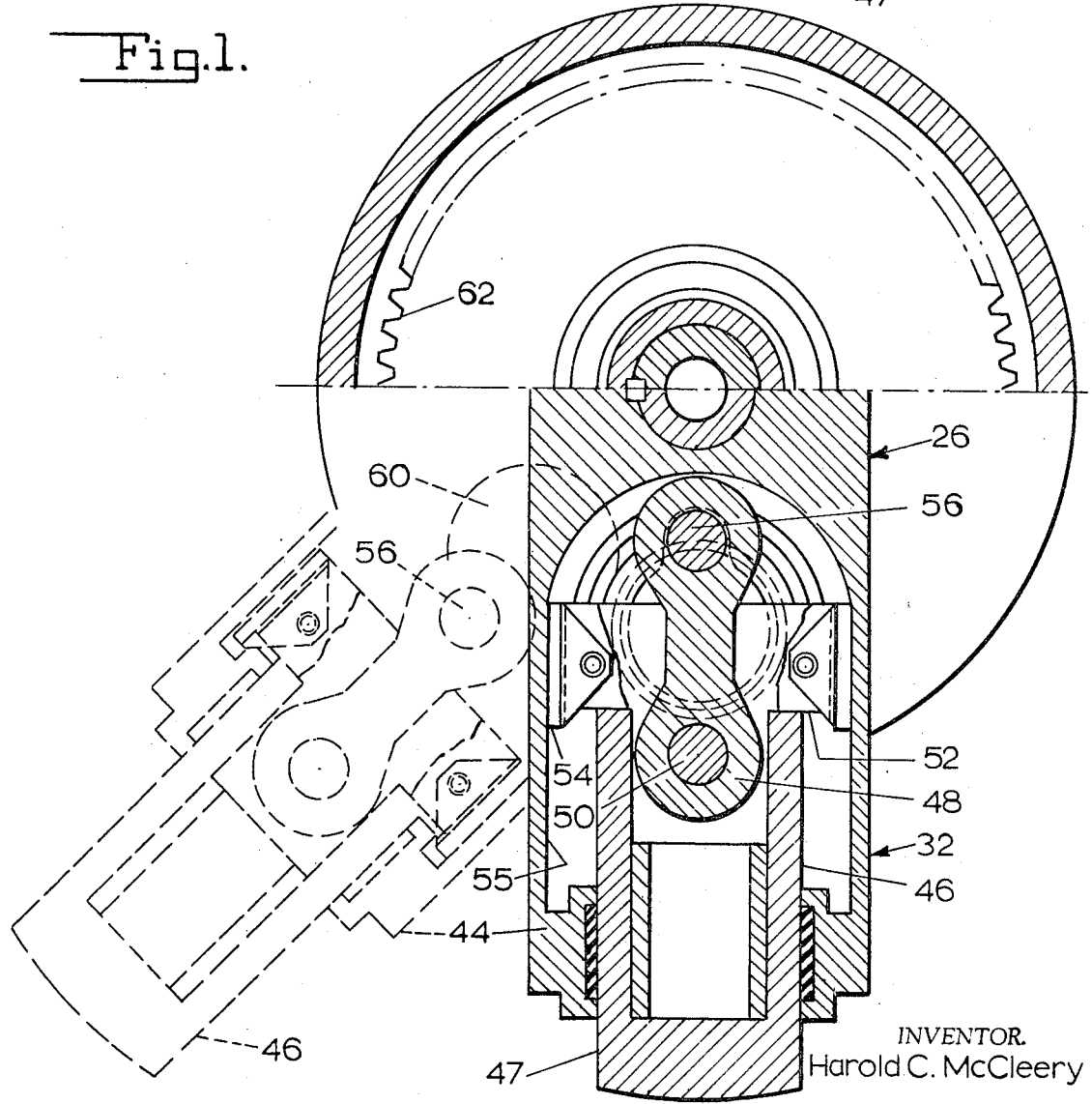
FIG. 4 is a sectional view taken substantially on the line 4—4 of FIG. 3.

The lower boring arm 32, as best seen in FIGS. 3 and 4, comprises an elongated hollow main arm portion 44 extending radially from the hub portion 38 and slidably non-rotatably receiving an elongated boring arm slide 46 of non-circular cross-section (shown as square) and having on its radially outer most end a bit carrier 47 rigidly secured to the slide 46 and forwardly extending and provided with a plurality of cutter bits 34 in a manner well known in the art. The slide 46, being hollow, internally receives and is pivotally connected to a connecting rod 48 as by a cross pin 50 extending transversely of the radially inner portion of the slide 46 and rigidly secured therein. Rigidly secured to the innermost end of the slide 46 and extending transversely thereof alongside the connecting rod 48 is a pair of guide members 52 extending outwardly beyond the surfaces of the slide 46 and provided at their ends with bearing pads 54 slidably received by an inner flat surface 55 of the main arm 44 to provide guidance for the slide 46 and resistance to the stresses imposed upon the guide 46 by the cutting action of the bits 34 tending to rock the slide 46 within the main arm 44 when mineral is being removed by the action of the bits 34.

The connecting rod 48 extending inwardly between the guide members 52 and therebeyond is pivotally received by a wrist portion of a crank shaft 56 or other eccentric means (see FIG. 6) rotatably mounted transversely of a radially inner portion of the main arm 44 and suitably journalled in suitable bearings 57 and 58 for rotation within the main arm portion 44. A portion of the crank shaft 56 extending rearwardly beyond the bearing 58 is provided with an externally toothed gear member 60 drivingly connected to crank shaft 56 as by splines or keys (not shown). Rigidly secured to a forwardly extending portion of the transmission 22 is an internally toothed gear member 62 coaxial with the boring arm shaft 40 and in toothed engagement with the gear member 60 and having a tooth ratio of 4 to 1 relative to the gear member 60 so that as the boring head 26 rotates about the axis of the boring arm shaft 40 the crank shaft 56, driven by the gear 60, makes four complete revolutions to every revolution of the boring arm 26.

As best seen in FIG. 4 rotation of the crank shaft 56 causes the slide 46 to be reciprocated radially outwardly with relation to the main arm 44 until after a boring head rotation of approximately 45° (as shown in the broken line portion of FIG. 4) the slide 46 has been moved to its outermost position with respect to the main arm 44. Further rotation of the boring head 26 with resulting rotation of the crank shaft 56 will retract the slide 46 within the main arm 44 to reach its radially inward position with respect to the main arm 44 at approximately 90° of rotation from the position shown solid in FIG. 4 with the slide 46 and the main arm 44 in the same relative positions with respect to each other as those shown in the solid portion of FIG. 4.

Figure 5:
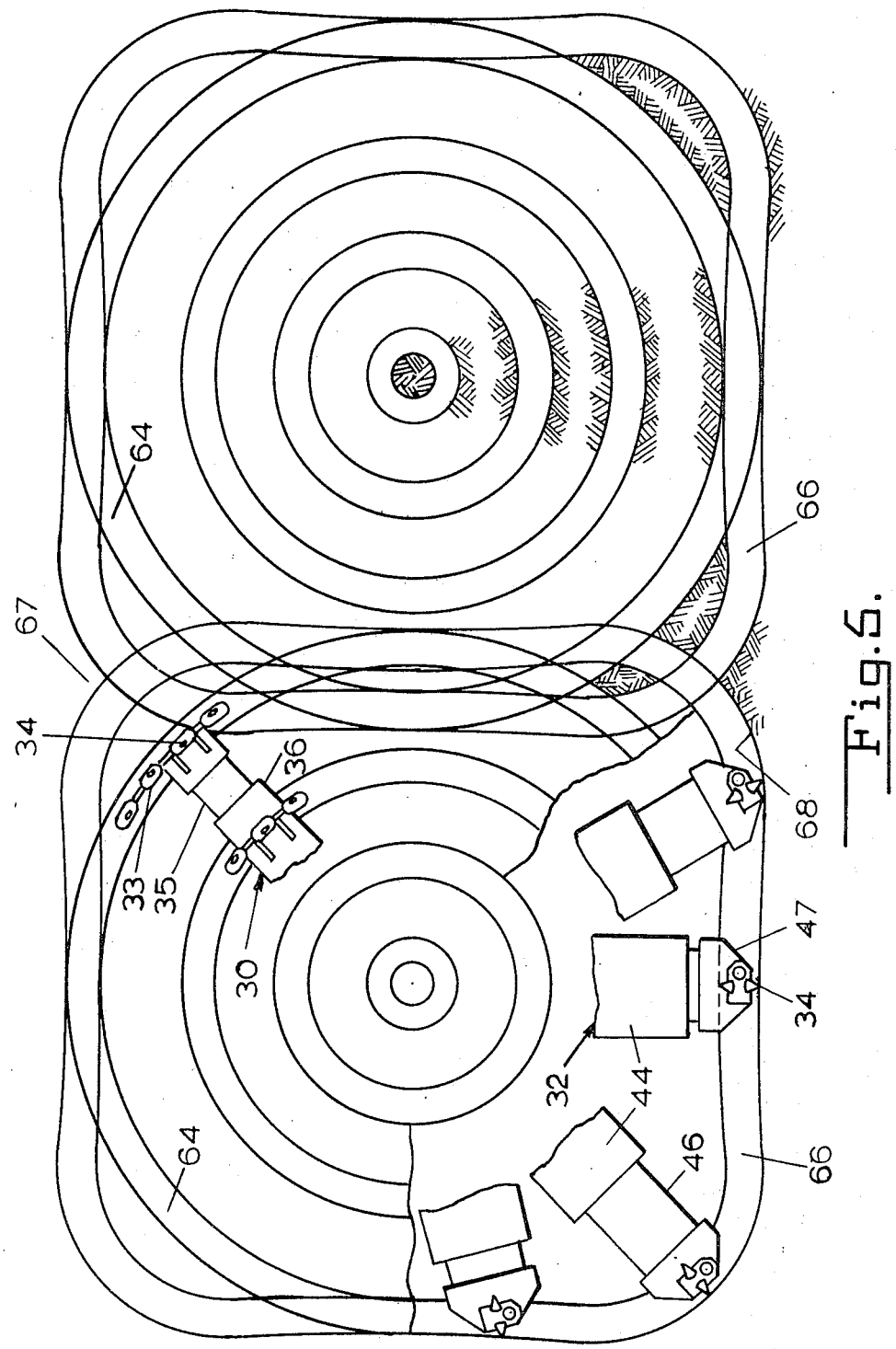
FIG. 5 is a schematic representation of the mining pattern produced by the mining machine of FIGS. 1–4.

It is to be appreciated that the left hand boring head 27 is constructed in exactly the same manner as that described for the right hand boring head 26 and will perform all the same functions excepting only that the right boring head 26 rotates in a counter clockwise direction as viewed from the front of the mining machine 10 while the left hand boring head 27 rotates in a clockwise direction in timed relationship to the boring head 26 so that there is no interference between the arms of the two boring heads 26 and 27 even when the bits 34 are being carried in overlapping orbits as seen in FIG. 5.

It is to be further appreciated that many of the advantages of this invention can be realized in the use of arms 26 and 27 to form non-overlapping but contiguous bores and that by mounting intermediate and inner bit carriers on the main arm 44 a single arm type of boring head (not shown) could be used to form a square or other non-circular bore suitable alone, or in combination with neighboring bores, to be used as a passageway through a mineral vein or other earth formation.

In normal operation of the machine, rotation of the boring heads 26 and 27 together with forward motion of the boring machine 10 on the mobile base 12 brings the bits 34 into contact with a mineral vein such as a vein of coal and performs a cutting action in the usual manner. The slide portion 35 of the boring arm 30, being held in fixed relationship to the main arm portion 36 of the boring arm 30 by pressurization of the head end of cylinder 42, carries the bits 34 and the bit carrier 33 in a circular orbit with the formation of a circular kerf 64 in a plane normal to the axis of rotation, by each of the boring arms 26 and 27. Intermediate and inner bit carriers, carrying other bits, form other circular kerfs, in a manner common to boring machines of the prior art as exemplified by the above cited Ball patent, with cores formed between the kerfs and broken out for complete removal of coal within a first planar area bounded by the circular kerf 64 thus forming a circular opening in the mineral vein, all as well known in the art. Simultaneously with, or shortly after, the formation of the circular kerfs 64 by the action of the bits 34 on the conventional arm 30, the bits 34 on the reciprocating arm 32, moved by the bit carrier 47 mounted on the reciprocating slide 46, activated by the crank 56 through the connecting rod 48, as above described, form a kerf 66 of substantially square outline with rounded corners due to the rotation of the boring heads 26 and 27 enlarging the circular opening by the removal of four equally spaced mineral portions of crescentic cross section external to the circular opening. In this manner a non-circular opening is formed by programmed boring, said opening having a central axis coincident with the axis of rotation and formed in a second planar area normal to the axis of rotation and somewhat rearwardly spaced therefrom. This non-circular opening has a profile in the form of a square with rounded corners circumscribed about the circular profile of the circular opening. Because of the 4 to 1 ratio of the crank shaft rotation as compared to the boring arm shaft rotation and due to the proper timing of the reciprocation of the slide 46, the square kerfs 64 are formed as shown in FIG. 5 and even though the corners are somewhat rounded the kerfs 66 overlap sufficiently to form relatively small cusps 67 and 68 (upper and lower respectively) rather than the much larger cusps which are left between overlapping circular bores by machines of the prior art. The upper cusp 67, depending from the ceiling of the passageway being formed in the mineral vein, is small enough so that it does not interfere with further use of the passageway or the progress of the machine therethrough, either advancing or retreating, so that the cusp 67 may be allowed to remain in place. The cusp 68 extending upwardly from the floor surface 13 is also very small but if desired may be removed by action of a plow member 19 (see FIG. 1) of approximately triangular cross-section extending forwardly from the front edge of the conveyor trough 18 and having a sharp edge laterally extending at the height of the floor surface 13. It is to be noted that since the cusp 68 formed by the mining machine of this invention is very much smaller than the cusps left by mining machines of the prior art the plow member 19 can be much smaller and will use much less horse power than in any boring type miner which forms bores of circular cross-section.

Figure 7:
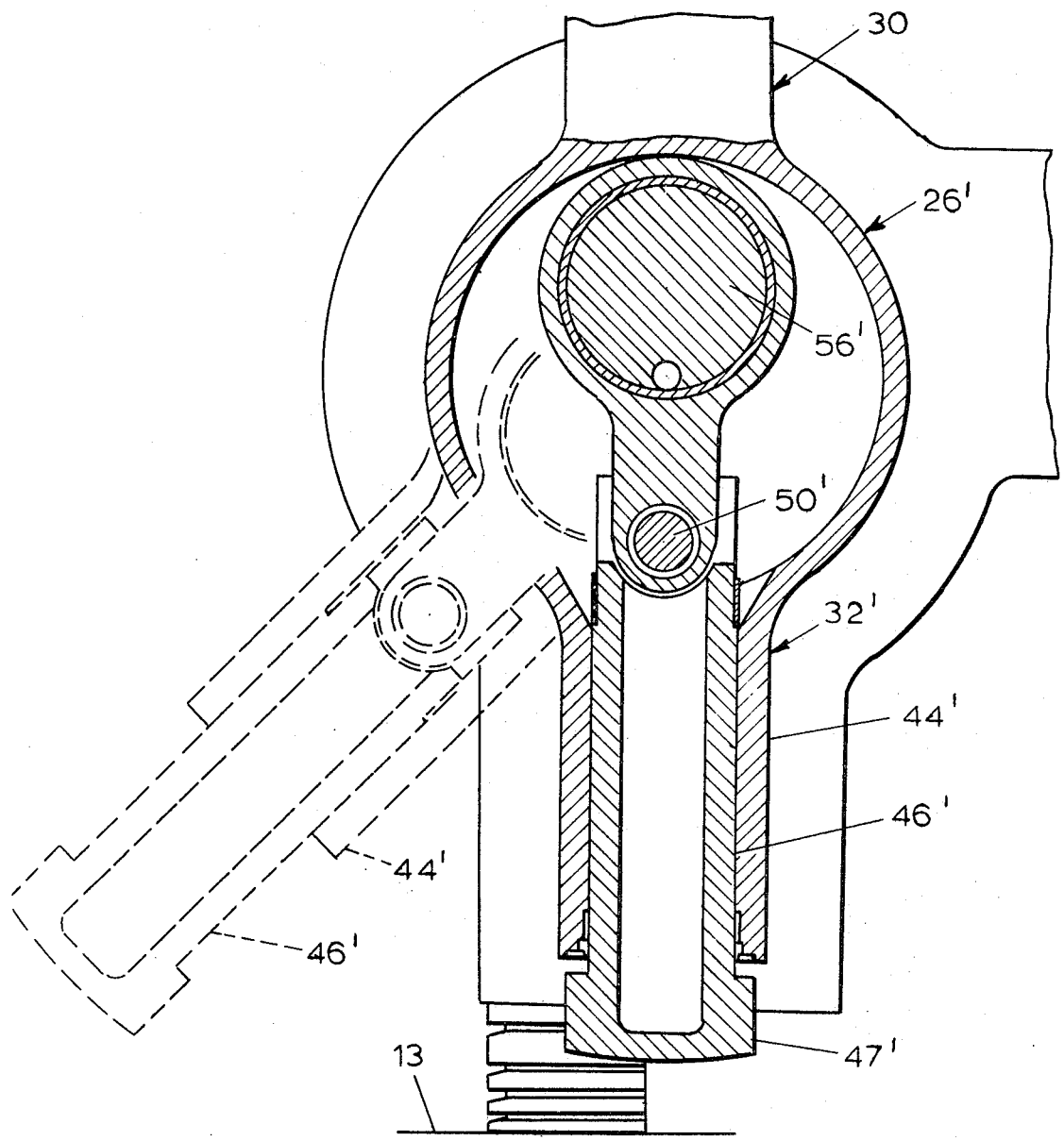
FIG. 7 is a partially sectional view taken substantially on line 7—7 of FIG. 6.

FIGS. 6 and 7 illustrate a second embodiment of the mining machine of this invention wherein elements which are the same as those of the first embodiment are shown with the same reference numerals as those used in the description of the first embodiment while parts of similar design and function are shown with the same reference numeral primed. In the second embodiment a boring head 26' has a boring arm 30 extending upwardly from the portion shown in FIGS. 6 and 7, entirely similar in design and function to the conventional boring arm 30 of the embodiment shown in FIGS. 1–5 including a main arm portion 36, a slide member 35, held in position by a cylinder 42 and mounting a bit carrier 33 with bits 34 all the same as shown in FIGS. 1–5 but not shown in FIGS. 6 and 7. Boring head 26' also comprises a radially extending reciprocating arm 32' shown in the lower position in FIGS. 6 and 7 and having a main arm portion 44' extending radially outwardly from a hub portion 38' of the boring head 26'. The main arm portion 44' is hollow and of non-circular cross-section (shown as square) to non-rotatably, slidably receive an elongated boring arm slide member 46' extending longitudinally through the main arm portion 44' and having mounted on its outer end a bit carrier 47' with bits 34 mounted thereon as in the case of the bit carrier 47 of the first embodiment. A cylindrical cross pin 50' is rigidly secured in a radially inward portion of the slide member 46' and pivotally receives and anchors one end of a connecting rod 48' having its other end pivotally engaged with a wrist portion of a crank shaft 56' suitably mounted and journalled for rotation within the boring head 26' about the axis of the boring arm shaft 40' on which the boring head 26' is mounted in keyed relationship for powered rotation therewith.

A suitable speed reduction transmission 22' similar to transmission 22 of the first embodiment is similarly powered by an electric motor 24 and is provided with a final reduction portion 69 which is the only portion of transmission 22' (see FIG. 7). The final reduction portion 69 comprises a main shaft 70 driven by the motor 24 and having on its end portion gear teeth 71 formed integrally with shaft 70 or otherwise drivingly rotatable with the shaft 70 as being gear teeth of a gear (not shown) splined or keyed to the external surface of shaft 70. The gear teeth 71 engages gear teeth on one or more satellite gears 72 suitably journalled and rotatably mounted in a gear cage 74 for rotation therein and therewith about the axis of boring arm shaft 40' with which the gear cage 74 is drivingly engaged by splines or keys as at 76. A set of internally extending stationary gear teeth 78 formed upon, or rigidly secured to, the inner surface of the casing of the final reduction 69 are drivingly engaged with the teeth of satellite gear 72 so that rotation of the main shaft 70 causing rotation of the gear 72 in engagement with the teeth 78 results in rotation of the gear cage 74, the boring arm shaft 40' and the boring head 26' in the same direction as the rotation of the shaft 70 with a reduction in speed governed by the ratio of the number of gear teeth 71 to the number of gear teeth 78, which in this case is a speed reduction of 4 to 1 so that the shaft 70 turns 4 times for every turn of the shaft 40' and the boring head 26'. An auxiliary main shaft 80 extends between the main shaft 70 and the crank shaft 56' and is in keyed or splined driving engagement with both of these members so that the crank shaft 56' turns at the same speed as the shaft 70 or four times as fast as the boring head 26'.

As best seen in FIG. 7, rotation of the crank shaft 56' into the position shown in broken line outline in FIG. 7 causes the slide 46' to be fully extended as shown, while a further rotation in a counter clockwise direction of approximately 45° brings the slide 46' into full retracted position with the boring arm 32' extending vertically downwardly as shown in solid lines in FIG. 7. It is to be understood that another boring head 27' for the left hand side of the machine is constructed in exactly the same manner as boring head 26' and mounted for cooperative action with the boring head 26' as described in the case of the boring heads 26 and 27 of the first embodiment.

The operation of the boring heads 26' and 27' being exactly the same as that of boring heads 26 and 27 (FIGS. 1–5) as regards results and kerfs formed, description of the operation is not considered necessary.

The embodiment of FIG. 7 has certain advantages over that of the FIGS. 1–5 among which are: greater radial length of engagement between the slide 46' and the main arm portion 44' than was possible in the first embodiment; the elimination of the gears 60 and 62 of the first embodiment since the final reduction 69 of the second embodiment is only a slight variation of that already present in the transmission 22 for driving the boring arm shaft 40 of the first embodiment and thus contains no extra parts; and larger more rugged parts made possible by the extra room within the boring head 26' afforded by rotation of the crank shaft 56' about the axis of shaft 40' in distinction to the crowding of the elements caused by crank shaft rotation at one side of the shaft 40 in the first embodiment.

Figure 8:
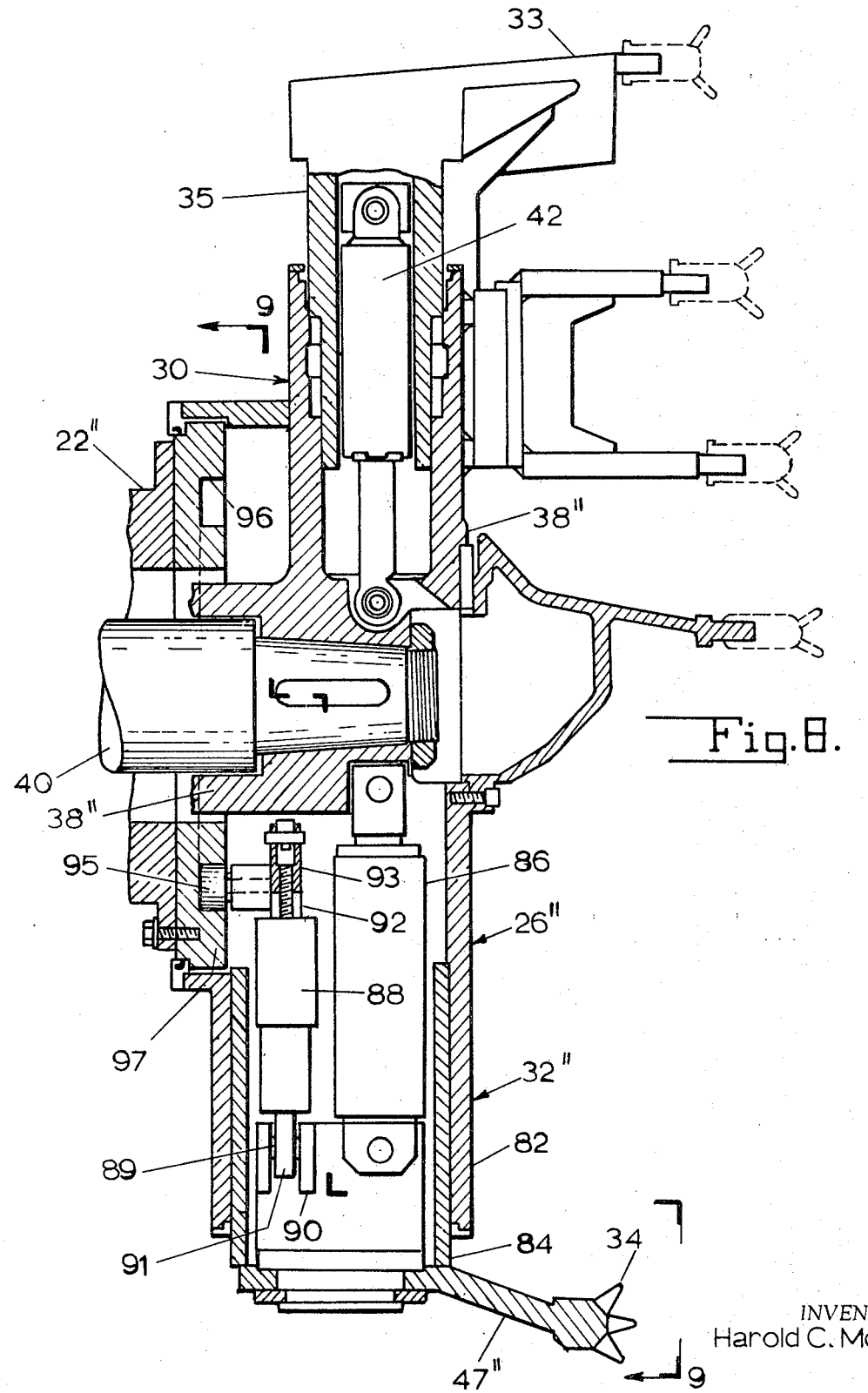
FIG. 8 is a median section of a boring head illustrating a third embodiment of the principles of this invention.
Figure 9:
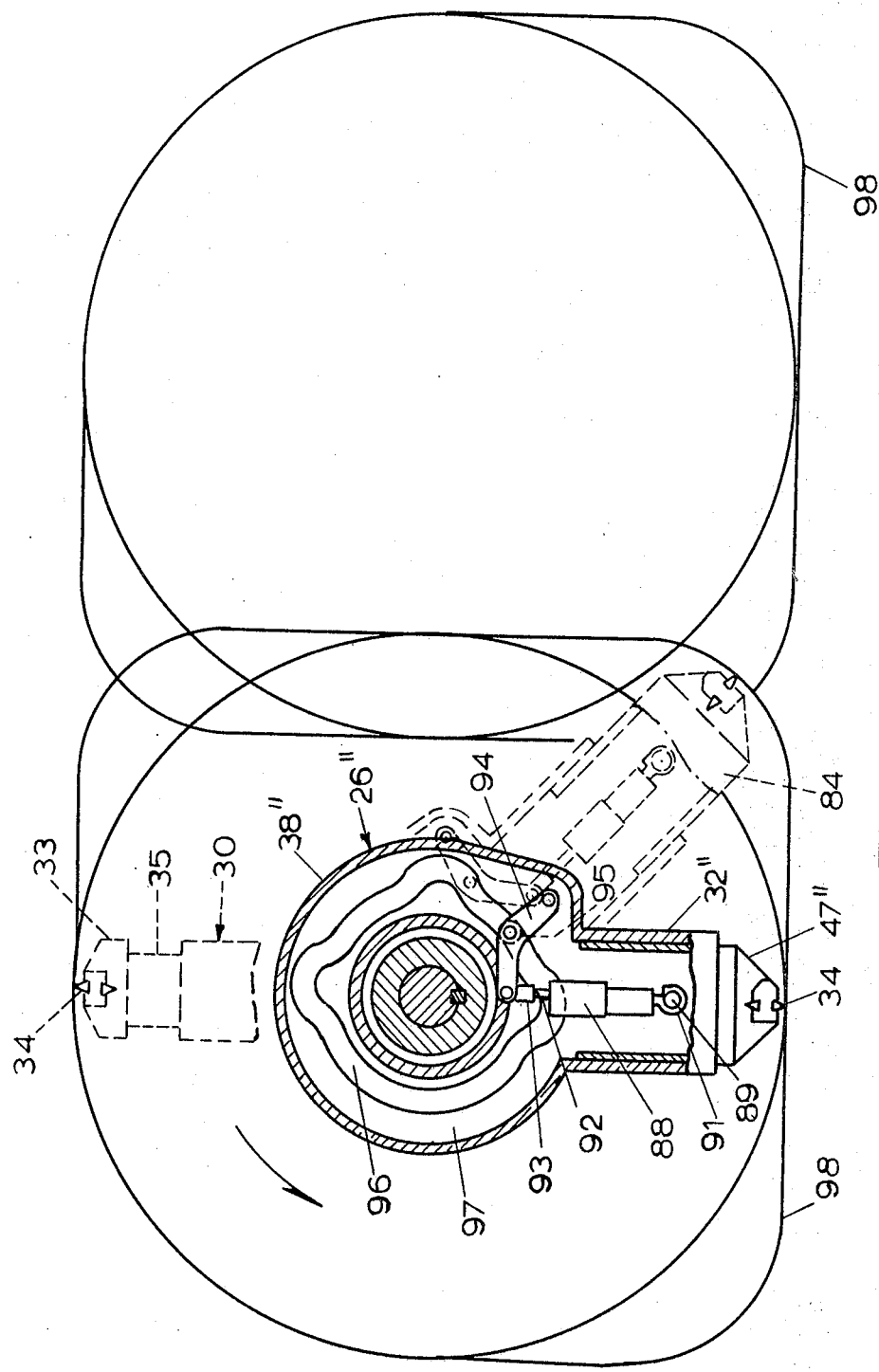
FIG. 9 is a schematic representation of the boring arm pattern produced by the embodiment of FIG. 8.

FIGS. 8 and 9 illustrate a third embodiment of the principles of this invention in a boring head 26" incorporating the same conventional arm 30 including the slide member 35, the bit carrier 33 and the cylinder 42 connected between the hub portion 38" and the slide member to maintain the slide member 35 in a desired position for producing a circular kerf as hereinbefore described. The reciprocating arm portion 32" shown extending downwardly in FIGS. 8 and 9 comprises a radially extending main arm portion 82 of non-circular cross-section (shown as square) slidably, non-rotatably receiving an elongated hollow slide member 84 having rigidly secured to its outer end a bit carrier 47" provided with bits 34 for cutting coal or other mineral as hereinbefore described. Extending radially outwardly from the hub portion 38" and pivotably secured thereto is an extensible member such as a hydraulic cylinder 86 having its radially outward end secured within an outer portion of the slide member 84.

The double tubing (not shown) extending through the center of the hollow boring arm shaft 40 is suitably connected as by hoses (not shown) to a servo valve 88 to furnish pressure fluid and return capacity for operation of the cylinder 86 to which the servo valve 88 is connetced as by hoses (not shown) so that either the head end or the rod end of the cylinder 86 may be pressurized while the opposite end is connected to tank in a manner well known in the art.

The servo valve 88 is of a well known type having relatively movable members responsive to forces applied tending to lengthen the servo valve 88 (extension force) so that the movable members will be positioned to pressurize the rod end of the cylinder 86 and simultaneously connect the head end to tank causing the cylinder 86 to shorten. In like manner the servo valve 88 responds to forces tending to shorten the servo valve 88 (compression force) to pressurize the head end of the cylinder 86 and to connect the rod end thereof to tank to cause the cylinder 86 to be lengthened in response to the compression force on the servo valve 88. The servo valve also has a neutral condition to which it returns in the absence of both compression and extension forces. In this neutral poistion both ends of the cylinder 86 are pressurized tending to hold the slide member 84 in a given position.

One of the movable members of the servo valve 88 is pivotally mounted within a radially outward portion of the slide member 84 as by a pair of mounting lugs 90 rigidly secured within the slide member 84 and pivotally connected to the head end bracket 91 of the servo valve 88 as by a pin 89 rigidly secured in the lugs 90. At the other end of the servo valve 88 a rod member 92 extending outwardly from and controlling a second movable member of the servo valve 88 has an adjustable clevis portion 93 threadedly secured thereon and pivotably connected to one end of a cam lever 94 pivotably mounted within an enlarged portion of the hub member 38" of the boring head 26". Mounted on an intermediate portion of the lever 94 is a cam follower means such as a roller 95 extending rearwardly from the lever 94 and rotatably received within a cam groove 96 formed in a cam plate 97 or other stationary camming member rigidly mounted on a forward portion of a transmission 22", in place of the gear member 62, otherwise entirely similar to the transmission 22 of the first embodiment shown in FIGS. 1 and 2.

As the boring head 26″ rotates under the driving power of the motor 24, through the transmission 22″, about the axis of the boring arm shaft 40, the conventional arm 30 operates as hereinabove described forming circular kerfs in the well known manner. However, upon rotation of the boring head 26″ the hub portion 38″ carries the lever 94 around the axis of the boring arm shaft 40 causing the cam roller 95 to travel along the groove 96 which has been designed in the present instance to apply a compression force on the servo valve 88 for the portion of rotation shown in FIG. 9 from the straight down (solid line) position to the 45° angle (broken line) position shown therein. It will be remembered that the servo valve 88 is so designed and connected that a compression force on the servo valve 88 will cause the head end of the cylinder 86 to be pressurized causing the cylinder 86 and the slide member 84 to be extended as shown in the broken line representation in FIG. 9. Upon further rotation in the counter clockwise direction the roller 95 following the groove 96 will apply an extension force to the servo valve 88 resulting as before described in pressurization of the rod end of the cylinder 86 causing retraction of the slide member 84 until the fully retracted position is reached at a point in the rotation 90° counter clockwise from the solid arm position shown in FIG. 9. After this point is reached the actions are repeated and the slide member 84 is again extended and retracted during the next 90° of arm rotation.

As the arm 32′ moves through the upper left hand quadrant of the FIG. 9 representation, the cam roller 95 will be in a portion of the groove 96 forming an arc of a circle which keeps the servo valve 88 in extended condition tending to retract the cylinder 86 so that throughout the upper left hand quadrant the slide portion 84 remains in the retracted position and the bits 34 on the bit carrier 47″ are carried in a portion of a circular arc during that quadrant of the rotation to be followed by extending and retracting actions through the next quarter of a turn so that the orbit of the bits 34 has an outline such as that shown in FIG. 9 at 98. This form, is substantially three sides of a square, with rounded corners, connected by a long arcuate circular portion having its center at the center of the square. When two such kerfs are combined, as shown in FIG. 9, the result is a pair of overlapping bores forming a substantially flat floor and a roof having a substantially flat central portion with rounded or arched corners. This is a very desirable roof contour in certain mining conditions as the rounded corners provide bracing to hold up the roof in a manner far superior to a flat roof.

It is of course to be realized that the use of the cam groove 96 in the embodiment of FIGS. 8 and 9 makes it possible to program the boring head 26″ for any shape of kerf and resulting bores that may be desired within the limitations imposed by the circular orbit of the conventional arm 30 and the amount and rate of possible extension and retraction of the slide portion 84.

Advantages resident in the embodiment of FIGS. 8 and 9 over that shown in the FIGS. 1–7 reside in the inherent simplicity of hydraulic control of motion and the fact that the boring head 26″ is almost completely self-contained and requires special equipment only in the cam plate 97 to be mounted on the forward end of the transmission 22″, since the hydraulic tubes within the boring arm shaft 40 are already present to control the positioning of slide member 35 of the conventional arm 30. A further advantage resident in the boring head 26″ is of course that described as freedom to choose any desired shape of bore cross-section best suited for the conditions encountered in a particular mining situation as well as in the fact that this shape of bore outline can be varied simply by changing the cam plate 97 for one having a different shape groove 96 therein.

Figures 10, 11:
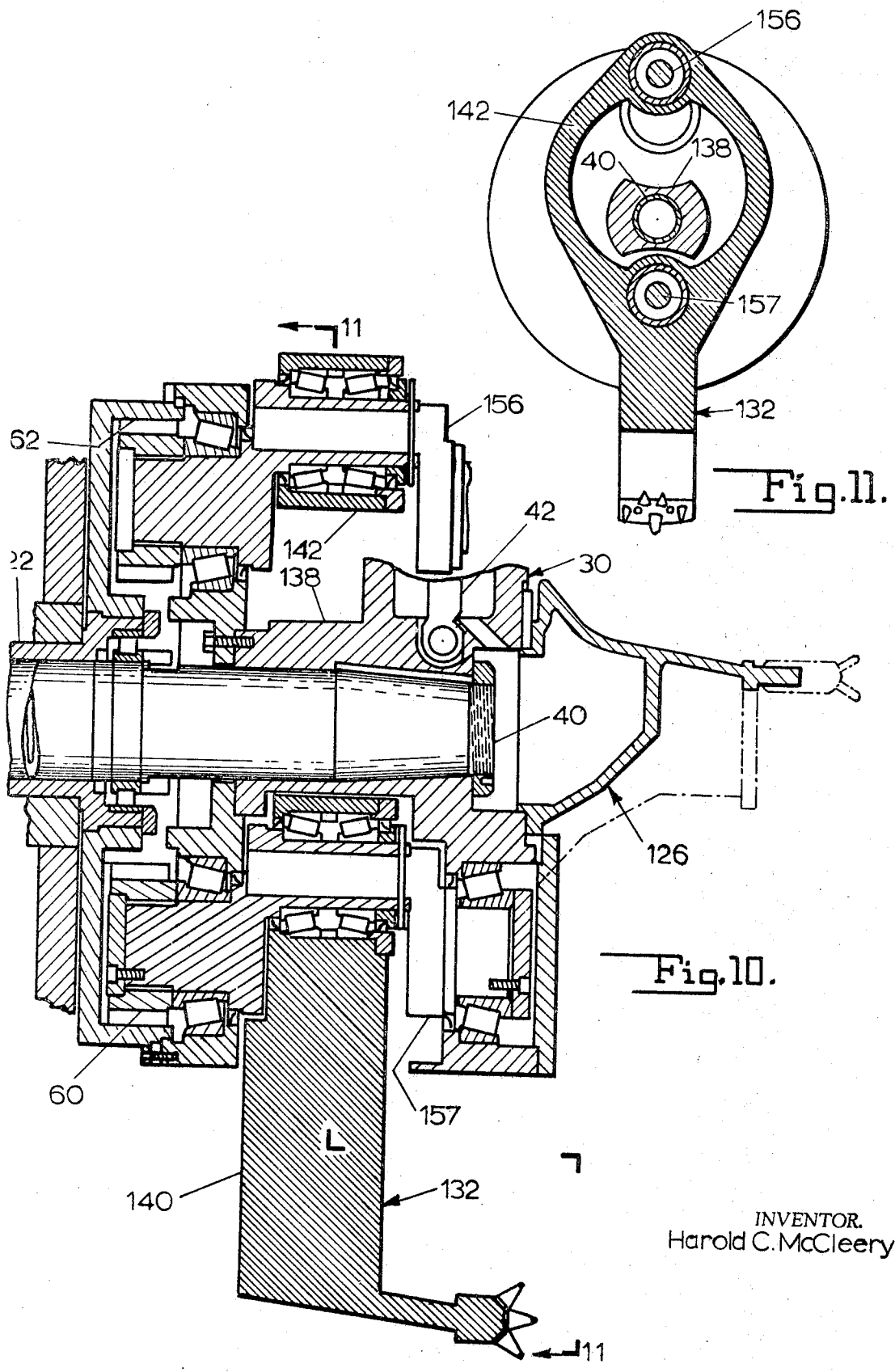
FIG. 10 is a median sectional view of a boring head illustrating a third embodiment of this invention.
FIG. 11 is a sectional view taken substantially on line 11—11 of FIG. 10.

FIGS. 10 and 11 illustrate a fourth embodiment of the principles of this invention in a boring head 126 incorporating the same conventional arm 30, including the slide member 35 (see FIG. 3) the bit carrier 33 and the cylinder 42 connected between a hub portion 138, mounted for rotation by the boring arm shaft 40, and the slide member to maintain the slide member 35 in a desired position for producing a circular kerf as hereinbefore described. A reciprocating arm 132 shown extending downwardly in FIGS. 10 and 11 comprises an elongated arm member 140 extending radially outward from the axis of the boring arm shaft 40 in a direction opposite to that of the upwardly extending arm 30. The arm member 140 has a ring shaped inner portion 142 encircling the hub portion 138 of the conventional arm 30 with the inner portion 142 being provided with a plurality of crank shafts 156 and 157 (upper and lower, respectively, shown as two but including three or more as desired) with the reciprocating arm 132 positioned slightly rearwardly from the conventional arm 30. Suitable bearings suitably mounted in the hub portion 138 and a rearward extension thereof support the crank shafts 156 and 157 in a manner similar to that earlier described in the case of the crank shaft 56 of the first embodiment with the crank shafts 156 carried around by the hub portion 138 as the conventional boring arm 30 rotates about the axis of the shaft 40. Again similarly to the crank shaft 56 of the first embodiment the crank shafts 156 and 157 have rearward extending portions on which are mounted pinion gears 60, respectively, in engagement with the internal toothed gear 62 having four times as many teeth as the pinions 60. This arrangement of gears and crank shafts gives the same action as that described in the case of the first embodiment (shown in FIGS. 1 through 5) and results in a kerf shape entirely similar to that shown in FIG. 5.

It is to be noted that the reciprocating arm of the fourth embodiment (FIGS. 10 and 11) is entirely external to the conventional arm 30 and thus avoids problems of maintaining sealing against coal dust and other contaminants on a reciprocating surface. In other words all of the necessary sealing for the reciprocating arm 132 will be on surfaces rotating with respect to one another rather than reciprocating as is the case in the earlier described embodiments of this invention.

The embodiment of FIGS. 10 and 11 has the same advantages over the prior art as described for the embodiments of FIGS. 1 through 8 with the further advantage of providing two point suspension of an independent reciprocating arm as well as the above described advantage of omitting the sealing of reciprocating surfaces.

It is to be noted that the principles of this invention can be embodied in a single boring head having one or more arms as well as in multiple cooperating boring heads forming contiguous or overlapping bores.

What is claimed is:

1. A mining machine of the boring arm type comprising: at least one boring device pivotally mounted for rotation about an axis; said boring device having a hub portion; at least one boring arm extending substantially radially outward from and rigidly attached to said hub portion for rotation therewith about said axis of rotation; said arm having at least one cutter carrying member mounted thereon; cutter means on said member; means for securing said member in a fixed relationship to said arm causing said cutter means on said member to move in a circular orbit upon rotation of said boring device; eccentric means moved in a circular orbit about said axis of rotation during said hub rotation and simultaneously revolved at a faster rate about a second axis; a portion of said eccentric means being connected to at least one other cutter carrying members to move said other cutter carrying member reciprocally radially with respect to said axis of said hub portion, cutter means on said other cutter carrying member movable in a planar non-circular orbit with portions of said non-circular orbit being more distant from said axis of rotation than the distance of said first mentioned circular orbit from said axis of rotation.

2. A mining machine as specified in claim 1 having a frame wherein: said at least one boring device is at least two boring devices and said cutter carrying members are slidable relative to said boring arms; and said eccentric means comprise at least one crank arm pivotaly mounted on and rotatable relative to said hub portion; planetary gearing rigidly fixed on a pivot portion of said crank arm controlling rotation of said crank arm by constant engagement with a stationary gear mounted on said frame; and means connecting said crank arm to said other cutter carrying member to cyclically reciprocate said other member along the respective boring arm.

3. A mining machine as specified in claim 2 wherein: said planetary gearing comprises a stationary internally toothed ring gear; a pinion mounted on said crank arm in driving relationship therewith and in engagement with said ring gear, said pinion having one fourth as many teeth as said ring gear.

4. A mining machine as specified in claim 3 wherein: each of said boring devices comprises at least two boring arms; said one cutter, carrying member is on one of said boring arms and said other cutter carrying member is on another of said boring arms; and said boring devices rotate about parallel axes laterally spaced less than twice the radial length of said one of said boring arms measured from said axis of rotation to said cutter means.

References Cited

UNITED STATES PATENTS

| | | | |
|---|---|---|---|
| Re. 24,479 | 6/1958 | Graham | 299—59 |
| 556,985 | 3/1896 | Hurd | 299—60 X |
| 2,825,544 | 3/1958 | Ahlson | 299—59 X |
| 3,035,822 | 5/1962 | Lundquist et al. | 299—61 |
| 3,108,788 | 10/1963 | Allimann | 299—60 X |
| 3,407,006 | 10/1968 | Brill et al. | 299—59 |
| 3,459,453 | 8/1969 | Brill et al. | 299—59 |

FOREIGN PATENTS

| | | |
|---|---|---|
| 1,321,556 | 2/1963 | France. |
| 118,437 | 4/1958 | U.S.S.R. |

ERNEST R. PURSER, Primary Examiner

U.S. Cl. X.R.

299—86, 80